United States Patent [19]

Jupp, deceased et al.

[11] 4,307,559

[45] Dec. 29, 1981

[54] TURF MAINTENANCE MACHINES

[75] Inventors: Robert A. Jupp, deceased, late of Ipswich, England, by Queenie C. Jupp, executrix; Edward J. Aldred, Ipswich, England

[73] Assignee: Rahsomes Sims & Jefferies Limited, Great Britain

[21] Appl. No.: 133,029

[22] Filed: Mar. 24, 1980

[30] Foreign Application Priority Data

Mar. 28, 1979 [GB] United Kingdom ............... 10808/79

[51] Int. Cl.³ .......................................... A01D 69/00
[52] U.S. Cl. ............................... 56/11.9; 56/DIG. 11; 56/17.1
[58] Field of Search ............... 56/11.9, 10.9, DIG. 11, 56/13.5–13.8, 17.1, 17.2

[56]     References Cited
       U.S. PATENT DOCUMENTS

| | | | |
|---|---|---|---|
| 3,748,840 | 7/1973 | Kaneg | 56/11.9 |
| 3,918,240 | 11/1975 | Haffner et al. | 56/11.9 |
| 4,173,110 | 11/1979 | Hansen | 56/11.9 |
| 4,183,195 | 1/1980 | James | 56/11.9 |

Primary Examiner—Robert A. Hafer
Attorney, Agent, or Firm—Wolf, Greenfield & Sacks

[57]     ABSTRACT

In turf maintenance machines, lifting and lowering of e.g. cutter units and partial counterbalancing of such units in their working positions may be provided by hydraulically actuated means comprising at least one selector valve, the or each valve having ports connected with at least one unit lifting ram, a pump, a reservoir and an accumulator. An operator can be certain that, when a unit is lowered to the ground, the required degree of partial counterbalance can be provided.

The selector valve is a four position spool valve which in the "lower" position thereof permits discharge of fluid from a ram to the reservoir thereby lowering an associated unit, while connecting the pump to charge the accumulator. When the unit reaches the ground the operator moves the valve to the counterbalance position, thereby counterbalancing the unit to the required extent by connecting the ram to the accumulator. The valve has six ports and preferably is connected in series-parallel relationship with other valves to permit independent lifting and lowering of units associated with respective valves.

7 Claims, 1 Drawing Figure

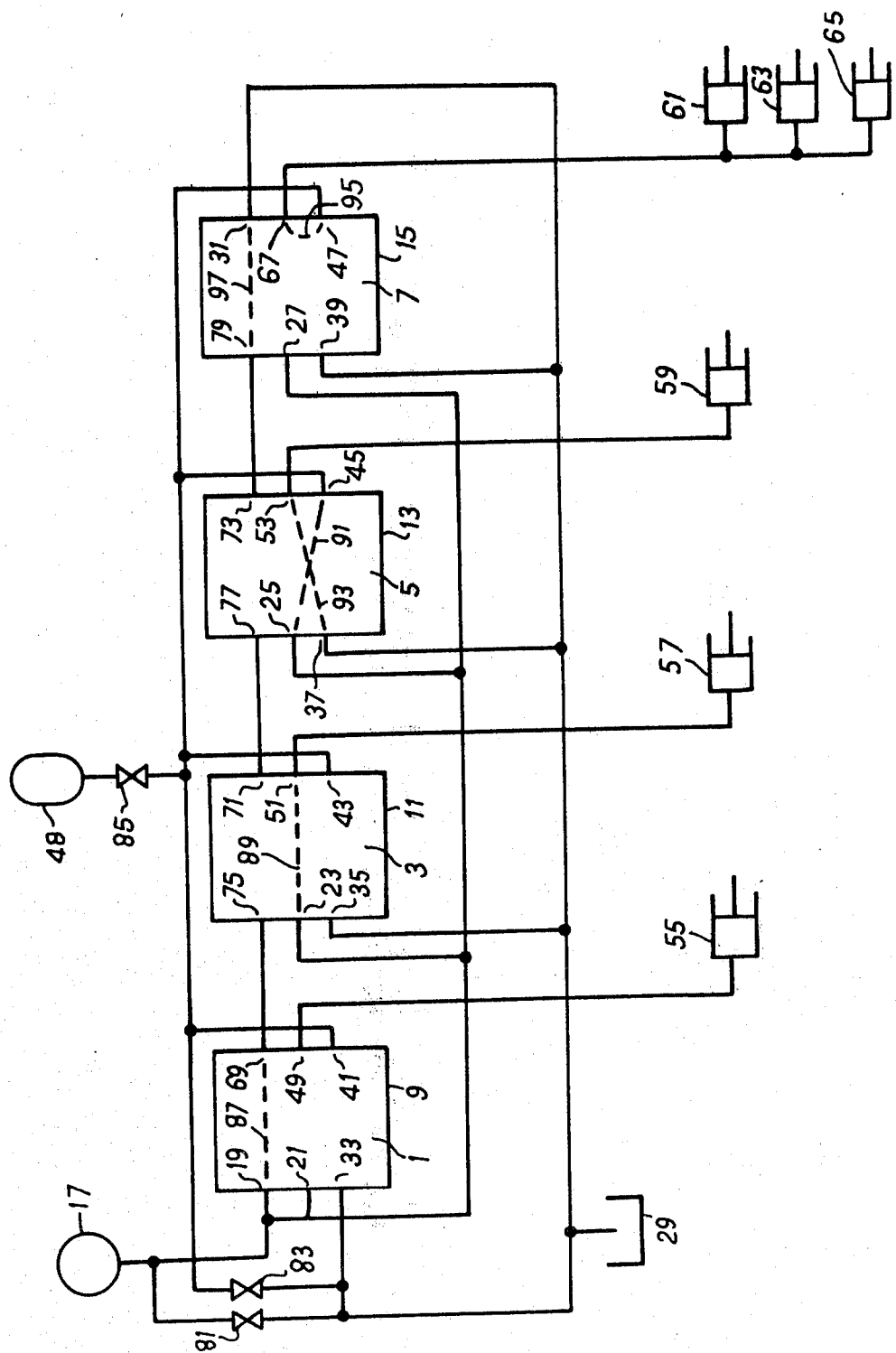

TURF MAINTENANCE MACHINES

This invention relates to turf maintenance machines and particularly though not exclusively to grass moving machines having at least one cutter unit and hydraulically actuated means for effecting lowering into, provision of at least partial counterbalance in, and lifting from, a working position of the cutter unit.

In grass mowing machines it is desirable that the cutter units are held in a partially counterbalanced fashion, allowing the units to float over the ground.

Partial counterbalancing of units and lowering and raising them into and out of service is provided for in a variety of ways in prior art machines. For example, partial counterbalancing forces may be produced and transmitted mechanically with the aid of torsion springs. The spring providing the counterbalancing force may be a helically-wound torsion spring which applies torque to a lifting and lowering arm on which cutter units are mounted. Such springs are usually large, expensive and difficult to make, and provision must be made for pretensioning during assembly and service. In addition, the springs are liable to fatigue failure, and a separate mechanism is required to lift and lower the arm. This mechanism typically includes an hydraulic ram containing hydraulic oil and connected to an oil reservoir and a pump. To raise the arm and an attached unit, oil is pumped from the reservoir into the ram to extend the ram.

It has previously been proposed to provide apparatus of the kind which is operable to enable not only lifting and lowering of a unit by an hydraulic means, but also hydraulic counterbalancing. One problem with such apparatus in the past has been that as a result of lowering the unit, at least some of the pressure in the accumulator is lost. The operator has accordingly had to select the "lift" position to ensure that the accumulator is fully charged to the selected pressure for providing the desired degree of partial counterbalancing of the unit in its working position. Thereafter the unit could be lowered to that positon. The problem faced by an operator is aggravated for gang machines with several cutter units.

It is an object of the present invention to provide a turf maintenance machine having at least one working unit and hydraulically actuated means for effecting lowering into, provision of at least partial counterbalance in, and lifting from, a working position of said unit, and which does not suffer the above disadvantage.

According to the invention there is provided a turf maintenance machine having at least one working unit and hydraulically actuated means for effecting lowering into, provision of at least partial counterbalance in, and lifting from, a working position of said unit, comprising a selector valve having a valve body formed with inlet and outlet ports and a movable selector member, a pump connected to an inlet port, a working unit lifting ram, an hydraulic accumulator, and an hydraulic fluid reservoir connected with respective outlet ports of the valve body and respective pressure relief valves connecting the pump and the accumulator with the reservoir, the selector member being movable from a neutral, position selectively to a "lift" position in which the pump is connected with lifting ram, to a "lower" position in which the lifting ram is connected to the reservoir and the pump is connected to the accumulator, or to a counterbalance, position in which the lifting ram is connected to the accumulator.

Thus, with the hydraulically actuated means in a machine of the present invention, the accumulator is charged from the pump as fluid discharges from the ram during lowering of the unit. This allows an operator to commence cutting with a unit which is initially resting on the ground by simply moving the valve to the counterbalance position, knowing that the accumulator will be charged to the required extent to provide the desired partial counterbalance during working.

The valve has first and second inlet ports connected in parallel to the pump and first and second outlet ports connected to the reservoir and in the neutral, and counterbalance, positions of the selector valve the pump is connected to the reservoir by way of the first inlet port and the first outlet port, whilst in the "lift" position, the pump is connected by way of the second inlet port to the ram and, in the "lower" position, the pump is connected by way of the second inlet port to the accumulator and the ram is connected by way of the second outlet port to the reservoir.

This kind of valve can advantageously be used in a machine comprising at least two valves having selector members independently movable to actuate respective working unit lifting rams. The valves can be connected to the pump by way of the second inlet ports, to the reservoir by way of the second outlet ports, to the accumulator by way of respective outlet ports and to resepective rams by way of outlet ports. The accumulator is charged during lowering of any unit and is connected via a respective valve to any unit which is being counterbalanced and consequently a single accumulator serves to provide counterbalance for each unit. When each selector member is in the neutral, or counterbalance, position, the pump connects with the reservoir by way of serially connected paths in the valves afforded in each valve between the first inlet and first outlet port thereof, whilst if any selector member is moved to the "lift" or "lower" position, this connection between pump and reservoir is blocked at the valve.

In one preferred form the invention comprises a grass mowing machine having at least one working unit in the form of a cutter unit.

One embodiment of the invention will now be described, by way of example, with refernce to the accompanying drawing which is a circuit diagram illustrating hydraulically actuated means for a grass mowing machine.

Although the embodiment of the invention hereinafter described concerns a grass mowing machine, the invention is broadly applicable, as will be apparent to those skilled in the art, to turf maintenance machines in which a working unit is raised and lowered with respect to and held partially counterbalanced in a working position.

Four selector valves, indicated by the numerals 1, 3, 5 and 7, respectively comprise a valve body 9, 11, 13 and 15 formed with inlet and outlet ports and a movable selector member (not shown). Suitably the selector valves are manually operable spool valves each having a selector member which may be moved from its neutral positon against a self-centering spring and including locking means for locking the spool in the counterbalance position.

Each valve has first and second inlet ports, first and second outlet ports and two further outlet ports. A pump 17 which operates continuously is connected to first inlet port 19 of valve 1 and second inlet ports 21, 23, 25 and 27 of valves 1, 3, 5 and 7 respectively. An hydraulic reservoir 29 is connected to first outlet port 31 of valve 7 and to second outlet ports 33, 35, 37 and 39 of valves 1, 3, 5 and 7 respectively. Outlet ports 41, 43, 45 and 47 are connected to an hydraulic accumulator 48, outlet ports 49, 51 and 53 are connected to respective cutter unit lifting rams 55, 57 and 59, and rams 61, 63 and 65 are connected to a common outlet port 67 of valve 7. First outlet ports 69, 71 and 73 of valves 1, 3 and 5 are connected to first inlet ports 75, 77 and 79 respectively of valves 3, 5 and 7. The circuit also includes respective pressure relief valves 81 and 83 connecting the pump 17 and the accumulator 48 with the reservoir 29. Valve 81 is a protective relief valve and permits flow from the pump to the reservoir if fluid pressure rises above the normal lifting pressure. Valve 83 is set to permit fluid flow from the accumulator to the reservoir when the pressure exceeds the desired counterbalance pressure. Thus it is by varying the pressure at which this valve opens that the amount of partial counterbalance to be applied to cutter units can be selected to meet working needs. A cutoff valve 85 is provided to permit isolation of the accumulator.

The hydraulically actuated means illustrated in the diagram effects lowering into, provision of at least partial counterbalance in and lifting from the working position of cutter units (not shown). Each cutter unit is mounted on a lifting arm which is pivotally moved by a respective lifting ram. The four selector members are independently movable into neutral, "lift", "lower" and counterbalance, positions. It is the provision of first and second inlet ports and first and second outlet ports in each valve body which makes independent operation of the valves possible. Whilst only one of each such inlet and outlet ports is necessary for the working of the invention, the independent operation which is possible with two is advantageous as it allows the operator freedom of choice as regards which unit or units are to be operated. Although in the diagram each valve is shown in a particular positon, each selector member is movable into all four positions. Valve 1 is shown in the neutral, position and valves 3, 5 and 7 are in "lift", "lower" and counterbalance, positions respectively. Broken lines indicate connections made via the selector members between ports. It is to be understood that passage of fluid from all the other ports, not shown connected, is blocked at those ports.

In the "lift" position, shown in valve 3, pump 17 is connected with cutter unit lifting ram 57 by way of connection 89 between second inlet port 23 and outlet port 51, thereby extending ram 57 and lifting its cutter unit (not shown) out of its working position. When the ram is fully extended, fluid flows via pressure relief valve 81 to the reservoir. As stated above, flow from the other ports of the valve is blocked, and in particular port 43 to the accumulator 48 is blocked.

Valve 5 is shown in the "lower" position, in which the pump is connected to the accumulator by way of ports 25 and 45 and connection 91, thereby charging the accumulator to the required pressure for providing counterbalance. When this pressure is reached relief valve 83 opens, permitting flow from the accumulator to the reservoir. Further, ram 59 discharges to the reservoir via connection 93 thereby lowering its cutter unit.

Valve 7 is shown in the counterbalance, position in which the accumulator is connected to rams 61, 63 and 65 by way of connection 95, providing partial counterbalance for units in their working positions. As rams 61, 63 and 65 are connected to a common outlet port 67, their cutter units are actuated simultaneously. A further connection 97 is made between first inlet port 97 and first outlet port 31.

In valve 1, in the neutral, position, connection is made between first inlet port 19 and first outlet port 69. The other ports are blocked at the valve and in particular outlet port 49 is blocked, preventing fluid flowing from ram 55, thus holding the ram fixed. It will be seen that if all valves were in neutral, or counterbalance, positions, the pump would connect with the reservoir by way of serially connected paths in the valves afforded in each valve between the first inlet and first outlet port thereof. However, since valves 3 and 5 are in the "lift" and "lower" positions respectively, this connection is blocked at those valves.

If it is desired to move the cutter unit associated with ram 55, for example, from a raised position to the ground, the spool of valve 1 is moved by the operator against a self-centering spring to the "lower" position as shown for valve 5, and the unit is lowered until it rests with its full weight on the ground. Accumulator 48, which may not initially have been charged to the required partial counterbalancing pressure (that is, the relief pressure of valve 83), will be fully charged to the desired extent during lowering. To commence working with the unit partially counterbalanced, the operator moves the valve to the counterbalance, position shown for valve 7, and locks the valve in the position, thereby connecting the ram 55 to the accumulator via the valve and partially counterbalancing the weight of the associated unit on the ground during the cutting operation.

Cutter units can be removed form their lifting arms when they are in their working position. The circuit includes a cutoff valve 85 which can be manually operated to isolate the accumulator, thereby preventing a lifting arm from rising uncontrollably under accumulator pressure when its cutter unit is removed.

While the circuit illustrated includes four selector valves it is to be understood that the invention also provides a machine which includes a single selector valve or two or more such valves. In the former case, in the neutral, and counterbalance, positions of the valve the pump would be connected to the reservoir; the valve could actuate a single ram or several rams could be connected to a common port for simultaneous actuation. Where there are several valves they may be connected in a series-like manner, or a series/parallel manner as shown in the diagram. Alternatively they could be connected in a parallel-like manner with the first inlet port of each valve connected to the pump and reservoir respectively.

We claim:

1. A turf maintenance machine having at least one working unit and hydraulically actuated means for effecting lowering into, provision of at least partial counterbalance in, and lifting from, a working position of said unit, comprising:

a selector valve having a valve body formed with first and second inlet ports, first, second, third and fourth outlet ports and a movable member within said body, said member having a "neutral" position, a "lift" position for lifting said unit, a "lower" position for lowering said unit and a "counterbalance" position for providing counterbalance in the working position of said unit;

a pump connected to said first and second inlet ports in parallel;

an hydraulic fluid reservoir connected with said first and second outlet ports;

a working unit lifting ram connected with the third outlet port;

an hydraulic accumulator connected with the fourth outlet port; and respective pressure relief valves connecting the pump and the accumulator with the reservoir;

wherein said selector member is movable from the "neutral" position in which the pump is connected to the reservoir by way of the first inlet and the first outlet ports selectively to the "lift" position in which the pump is connected by way of the second inlet port with the lifting ram, to the "lower" position in which the lifting ram is connected by way of the second outlet port to the reservoir and the pump is connected by way of the second inlet port to the accumulator, or to the "counterbalance" position in which the lifting ram is connected to the accumulator and the pump is connected to the reservoir by way of the first inlet and first outlet ports.

2. A turf maintenance machine according to claim 1 comprising at least two valves having selector members independently movable to actuate respective working unit lifting rams, wherein the valves are connected to the pump by way of the second inlet ports, to the reservoir by way of the second outlet ports, to the accumulator by way of respective outlet ports and to respective rams by way of outlet ports, and wherein when each selector member is in the neutral or counterbalance position, the pump connects with the reservoir by way of serially connected paths in the valves afforded in each valve between the first inlet and first outlet port thereof, whilst if any selector member is moved to the "lift" or "lower" position, this connection between pump and reservoir is blocked at that valve.

3. A turf maintenance machine according to claim 1, wherein two or more working unit lifting rams for simultaneous actuation are connected to a common outlet port of a selector valve.

4. A turf maintenance machine as claimed in claim 1, wherein the selector member is a spool and the selector valve is a manually operable spool valve.

5. A turf maintenance machine according to claim 4, wherein the valve includes a self-centering spring, the spool being movable from the neutral position to the "lower", "lift" or counterbalance position against the spring, and locking means are provided for locking the spool in the counterbalance position.

6. A turf maintenance machine as claimed in claim 1, including a cut-off valve operable to isolate the accumulator.

7. A turf maintenance machine as claimed in claim 1, wherein the machine is a grass mowing machine having at least one working unit in the form of a cutter unit.

* * * * *